United States Patent
Fang et al.

(10) Patent No.: US 11,483,677 B2
(45) Date of Patent: Oct. 25, 2022

(54) INFORMATION PUSHING METHOD AND TERMINAL DEVICE

(71) Applicant: Huawei Technologies Co., Ltd., Shenzhen (CN)

(72) Inventors: Weiqing Fang, Beijing (CN); Hsienyang Lu, Shenzhen (CN); Donghao Zhang, Xi'an (CN); Yankun Luo, Shenzhen (CN); Zhongyan Chai, Shanghai (CN); Chen Liu, Xi'an (CN); Jie Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/972,998

(22) PCT Filed: Jun. 7, 2018

(86) PCT No.: PCT/CN2018/090312
§ 371 (c)(1),
(2) Date: Dec. 7, 2020

(87) PCT Pub. No.: WO2019/232759
PCT Pub. Date: Dec. 12, 2019

(65) Prior Publication Data
US 2021/0258730 A1    Aug. 19, 2021

(51) Int. Cl.
*H04W 4/029* (2018.01)
*G01S 19/01* (2010.01)
(Continued)

(52) U.S. Cl.
CPC .............. *H04W 4/029* (2018.02); *G01S 19/01* (2013.01); *H04L 67/52* (2022.05); *H04L 67/55* (2022.05)

(58) Field of Classification Search
CPC ....... H04W 4/029; H04W 4/02; H04W 4/021; H04W 64/00; H04W 4/025; H04W 4/027;
(Continued)

(56) References Cited

U.S. PATENT DOCUMENTS 8,099,105 B2    1/2012  Morin
2006/0014531 A1*  1/2006  Nam .................. H04L 67/18
                                              455/418
(Continued)

FOREIGN PATENT DOCUMENTS

CN    101183293 B    6/2010
CN    101730204 A    6/2010
(Continued)

*Primary Examiner* — Kwasi Karikari
(74) *Attorney, Agent, or Firm* — Leydig, Voit & Mayer, Ltd.

(57) ABSTRACT

A method for tracking a terminal device having a cellular modem and a positioning module is disclosed. The method comprises monitoring a location of a terminal device through a cellular network using the cellular modem of the terminal device, while the positioning module of the terminal device is disabled; determining that the terminal device enters a first cell of the cellular network based on signals from the cellular modem; enabling the positioning module of the terminal device in response to the determination that the terminal device enters the first cell; and obtaining from the positioning module a first geographical location of the terminal device in the first cell.

18 Claims, 10 Drawing Sheets

(51) Int. Cl.
*H04L 67/52* (2022.01)
*H04L 67/55* (2022.01)

(58) Field of Classification Search
CPC ............... H04W 64/003; H04W 36/32; H04W 52/0274; H04W 52/0296
See application file for complete search history.

(56) References Cited

U.S. PATENT DOCUMENTS

| | | | |
|---|---|---|---|
| 2009/0319166 A1 | 12/2009 | Khosravy et al. | |
| 2012/0221239 A1 | 8/2012 | Cooper et al. | |
| 2012/0309376 A1* | 12/2012 | Huang ................... | H04W 4/02 455/418 |
| 2013/0024932 A1 | 1/2013 | Toebes et al. | |
| 2013/0061147 A1 | 3/2013 | Beaurepaire | |
| 2013/0076523 A1* | 3/2013 | Kwan ................... | A61B 5/0022 340/686.6 |
| 2014/0274121 A1* | 9/2014 | Raniere ................. | H04W 4/02 455/456.1 |
| 2018/0014161 A1* | 1/2018 | Warren ................ | H04W 4/023 |

FOREIGN PATENT DOCUMENTS

| | | |
|---|---|---|
| CN | 101951444 A | 1/2011 |
| CN | 102067633 A | 5/2011 |
| CN | 103269510 A | 8/2013 |
| CN | 103929809 A | 7/2014 |
| CN | 105307246 A | 2/2016 |
| CN | 105474129 A | 4/2016 |
| CN | 105491526 A | 4/2016 |
| CN | 105828293 A | 8/2016 |
| CN | 106060907 A | 10/2016 |
| CN | 106325882 A | 1/2017 |
| CN | 106354509 A | 1/2017 |
| CN | 106371704 A | 2/2017 |
| CN | 106406880 A | 2/2017 |
| CN | 106598611 A | 4/2017 |
| CN | 106648325 A | 5/2017 |
| CN | 103135967 B | 7/2017 |
| CN | 106919306 A | 7/2017 |
| CN | 107454180 A | 12/2017 |
| CN | 107733984 A | 2/2018 |
| CN | 108574713 A | 9/2018 |
| WO | 2004004372 A1 | 1/2004 |

* cited by examiner

INFORMATION PUSHING METHOD AND TERMINAL DEVICE

CROSS-REFERENCE TO RELATED APPLICATIONS

This application is a national stage of International Application No. PCT/CN2018/090312, filed on Jun. 7, 2018, the entirety of which is incorporated herein by reference.

TECHNICAL FIELD

This application relates to the field of terminal technologies, and in particular, to an information pushing method and a terminal device.

BACKGROUND

As the development of communications technology, various functions of a terminal device are gradually improved. Currently, the terminal device has become an important tool of a user for obtaining information. A mobile phone is used as an example, and a user may search for a nearby scenic spot, a nearby entertainment place, and the like by using the mobile phone. Generally, when the user opens a specific application program such as Meituan on the mobile phone, the application program prompts the user to start a global positioning system (global positioning system, GPS). After the user starts the GPS, the application program locates a current geographical location of the mobile phone by using the GPS, and then recommends information of nearby food shops, cinemas, and the like to the user.

FIG. 1 is a schematic diagram of a process in which a terminal device recommends information to a user by using a specific application program in the prior art. In FIG. 1, the terminal device includes an application processor (application processor, AP), an application program, and a GPS module. When the user wants to obtain information of nearby scenic spots, stores, and the like, the user opens an application program on the terminal device to query the information of the nearby scenic spots, stores and the like, and the application program may prompt the user to start the GPS module. After the user starts the GPS module, the GPS module locates a current geographical location, and sends the geographical location to the application processor. The application processor reports information of the geographical location to a server. The server determines the information of the nearby scenic spots, stores based on the geographical location, and then sends the determined information of the scenic spots and the stores to the application processor. The application processor pushes the information to the user by using the application program. It can be learned from FIG. 1 that, in the prior art, when the user wants to obtain information of nearby scenic spots, stores, and the like, the user needs to open the specific application program on the mobile phone to view information of the nearby scenic spots, entertainment places, and the like. Operations are complex, efficiency is relatively low, and user experience is relatively poor.

SUMMARY

This application provides an information pushing method and a terminal device, to recommend information to a user in a screen-locked state, so that the user can learn related information without opening a specific application program. This facilitates user operations and improves user experience.

According to a first aspect, this application provides an information pushing method. The method is applicable to a terminal device. The terminal device includes a coprocessor, an application processor, a modem, a positioning module, and an output device. The coprocessor is separately connected to the positioning module, the application processor, and the modem. The application processor is connected to the output device. The terminal device stores cell information of at least one cell, and the at least one cell includes a first cell. The method includes: after determining by using the modem that the terminal device enters the first cell, triggering, by the coprocessor in a screen-locked state, to enable the positioning module, and obtaining, by using the positioning module, a first geographical location of the terminal device in the first cell; determining, by the coprocessor, that a place of interest exists in a range covered by the first cell and is located near the first geographical location; and sending, by the coprocessor, information of the place of interest to the application processor, where the application processor outputs the information of the place of interest by using the output device.

In this embodiment of this application, when the terminal device is in the screen-locked state, the application processor and the positioning module do not need to be always in an enabled state, and the coprocessor with relatively low power consumption determines whether the terminal device enters a cell. If the terminal device enters the cell, the coprocessor triggers to enable the positioning module to detect a current geographical location. When determining that a place of interest exists and is located near the geographical location, the coprocessor recommends the place of interest to the user by using the application processor. In a solution provided in this embodiment of this application, power consumption of the coprocessor or the modem is less than power consumption of the application processor or the positioning module. Therefore, in this manner, information is recommended to the user in the screen-locked state, and power consumption is also reduced.

In a possible design, when determining, by using the modem, that the terminal device enters the first cell, the coprocessor specifically performs the following steps: The coprocessor determines a current camping cell of the terminal device by using the modem. If the first cell and the camping cell are a same cell, the coprocessor determines that the terminal device enters the first cell.

In this embodiment of this application, the coprocessor may be communicatively connected to the modem. After the modem determines a current camping cell of the terminal device, if the camping cell and the first cell are a same cell, the coprocessor determines that the terminal device enters the first cell. In this manner, when the terminal device is in the screen-locked state, the positioning module and the application processor do not need to be always enabled, and the coprocessor with relatively low power consumption determines a nearby place of interest. This facilitates to reduce power consumption, and can recommend information to the user in the screen-locked state.

In a possible design, that the first cell and the camping cell are a same cell includes: a cell ID of the camping cell being the same as a cell ID of the first cell.

In this embodiment of this application, the terminal device may determine whether the camping cell and the first cell are a same cell by determining whether cell IDs are the same. Alternatively, another method can be used for determining and this is not limited in this embodiment of this application.

In a possible design, the terminal device further stores a geographical location of a place of interest covered by each of the at least one cell. When determining whether a place of interest exists in a range covered by the first cell and is located near the first geographical location, the coprocessor is specifically perform the following step: The coprocessor determines from all places of interest covered by the first cell, a place of interest whose distance from the first geographical location is less than a preset distance.

In this embodiment of this application, the coprocessor only needs to search a memory for a place of interest that exists in a range covered by the first cell and that is located near the first geographical location. In this manner, when the terminal device is in the screen-locked state, the positioning module and the application processor do not need to be always enabled, and the coprocessor with relatively low power consumption determines a nearby place of interest such as a store or a scenic spot. This facilitates to reduce power consumption, and can recommend information to the user in the screen-locked state.

In a possible design, the positioning module includes a GPS positioning module or a Wi-Fi positioning module.

In this embodiment of this application, the foregoing two types of positioning modules are merely examples, and the positioning module may alternatively be another module that can locate the current geographical location. This is not limited in this embodiment of this application.

In a possible design, when triggering to enable the positioning module, the coprocessor performs the following steps: The coprocessor determines a current moving speed of the terminal device. If the moving speed is greater than or equal to a first preset speed, the coprocessor periodically trigger, at a period of a first duration, to enable the positioning module. If the moving speed is less than the first preset speed, the coprocessor periodically trigger, at a period of a second duration, the positioning module. The first duration is less than the second duration.

In this embodiment of this application, when triggering to enable the positioning module, the coprocessor may periodically trigger, based on the current moving speed of the terminal device, to enable the positioning module. For example, when the terminal device moves relatively fast, the positioning module is periodically triggered, at a relatively short period, to be enabled. When the terminal device moves relatively slow, the positioning module is periodically triggered at a relatively long period, to be enabled. In this manner, when the terminal device is in the screen-locked state, the positioning module does not need to be always enabled. This facilitates to reduce power consumption, and can recommend information to the user in the screen-locked state.

In a possible design, when outputting the information of the place of interest by using the output device, the application processor specifically performs the following steps: The application processor determines a first application based on the place of interest, and displays a shortcut on a display screen, where the shortcut is used to open the first application, to display information related to the place of interest.

In this embodiment of this application, the terminal device may display a shortcut, and when triggering the shortcut, the user can open the first application, to display the information related to the place of interest. In this manner, information can be recommended to the user in the screen-locked state, and the recommended information is related to a nearby place of interest (such as a store or a scenic spot) in an application. This facilitates user operations and improves user experience.

In a possible design, when determining the first application based on the place of interest, the application processor specifically performs the following step: The application processor runs a management service application program on the terminal device, to determine the first application corresponding to the place of interest.

In this embodiment of this application, the management service application program on the terminal device may manage different application programs. For example, the management application program knows a function of each application (a locally installed application or an uninstalled application). For example, the management application program knows which applications may be used to obtain travel-related information and which applications may be used to obtain food-related information. The application processor runs the management service application program, to determine the first application corresponding to the place of interest (such as a store or a scenic spot). In this manner, information can be recommended to the user in the screen-locked state, and the recommended information is related to a nearby place of interest in an application. This facilitates user operations and improves user experience.

In a possible design, the coprocessor disables the positioning module after the coprocessor determines, by using the modem, that the terminal device leaves the first cell.

In this embodiment of this application, after determining that the terminal device leaves the first cell, the positioning module is disabled. This facilitates to reduce power consumption.

In a possible design, the screen-locked state is a screen-locked and screen-off state, and before the coprocessor sends the information of the place of interest to the application processor, the application processor is in a sleep state. The coprocessor triggers to wake up the application processor.

In this embodiment of this application, when the screen-locked state is the screen-locked and screen-off state, the application processor is in the sleep state. The coprocessor triggers to wake up the application processor, and sends information of the determined place of interest to the application processor. In this manner, when the terminal device is in the screen-locked and screen-off state, the application processor does not need to be always enabled, and the coprocessor with relatively low power consumption determines a nearby place of interest. This facilitates to reduce power consumption, and can recommend information to the user in the screen-locked state.

In a possible design, the coprocessor triggers the application processor based on the cell information of the first cell, and the application processor downloads cell information of a new cell from a server, where the new cell includes another cell that is located around the first cell and that does not exist in the at least one cell. The application processor stores the downloaded cell information of the new cell.

In this embodiment of this application, the application processor in the terminal device downloads the cell information of the new cell from the server, to update the cell information of the at least one cell stored in the memory. In this manner, the cell information of the cell stored in the memory may be updated in real time for use by the coprocessor. In this manner, when the terminal device is in the screen-locked state, the application processor and the positioning module do not need to be always enabled, and the coprocessor with relatively low power consumption determines a nearby place of interest. This facilitates to reduce power consumption, and achieves a purpose of recommending information to the user in the screen-locked state.

According to a second aspect, an embodiment of this application provides an information pushing method, and the method is applied to a terminal device. The terminal device includes an application processor, a modem, a positioning module and an output device. The application processor is separately connected to the positioning module, the modem, and the output device. The terminal device stores cell information of at least one cell. The at least one cell includes a first cell. The method includes: after determining by using the modem that the terminal device enters the first cell, triggering, by the application processor in a screen-locked state, to enable the positioning module, and obtaining, by using the positioning module, a first geographical location of the terminal device in the first cell; determining, by the application processor, that a place of interest exists in a range covered by the first cell and is located near the first geographical location; and outputting, by the application processor, information of the place of interest by using the output device.

In this embodiment of this application, the terminal device first determines that the terminal device enters the first cell, and then searches for a nearby place of interest within coverage of the first cell. This facilitates to improve accuracy of place of interest recommendation. The positioning module does not need to be always enabled. The positioning module is enabled only after the terminal device enters a cell, to detect a current geographical location. This facilitates to reduce power consumption.

In a possible design, when determining, by using the modem, that the terminal device enters the first cell, the application processor specifically performs the following steps: The application processor determines a current camping cell of the terminal device by using the modem. If the first cell and the camping cell are a same cell, the application processor determines that the terminal device enters the first cell.

In this embodiment of this application, the terminal device first determines that the terminal device enters the first cell, and then searches for a nearby place of interest within coverage of the first cell. Specifically, the terminal device determines, by determining whether the camping cell and the first cell are a same cell, whether the terminal device enters the first cell. In this manner, in the screen-locked state, the terminal device may relatively accurately determine the nearby place of interest, and recommend the place of interest to the user. This improves user experience.

In a possible design, that the first cell and the camping cell are a same cell includes: a cell ID of the camping cell being the same as a cell ID of the first cell.

In this embodiment of this application, the terminal device may determine whether the camping cell and the first cell are a same cell by determining whether cell IDs are the same. Alternatively, another method can be used for determining and this is not limited in this embodiment of this application.

In a possible design, the terminal device further stores a geographical location of a place of interest covered by each of the at least one cell. That the application processor determines whether a place of interest exists in a range covered by the first cell and is located near the first geographical location includes: determining, by the application processor, from all places of interest covered by the first cell, a place of interest whose distance from the first geographical location is less than a preset distance.

In this embodiment of this application, the application processor only needs to search a memory for a place of interest that exists in a range covered by the first cell and that is located near the first geographical location. This process is simple, and can recommend information to a user in the screen-locked state. This facilitates to improve user experience.

In a possible design, that the application processor is further configured to determine whether a place of interest exists in a range covered by the first cell and is located near the first geographical location includes: sending, by the application processor, a cell ID of the first cell and the first geographical location to a server by using a sending unit in the terminal device, and determining, by the server, based on the cell ID of the first cell and the first geographical location, the place of interest that exists in the range covered by the first cell and is located near the first geographical location; and receiving, by the application processor by using a receiving unit in the terminal device, the information of the place of interest sent by the server.

In this embodiment of this application, the application processor may further obtain, by using the server, the place of interest that exists in a range covered by the first cell and that is located near the first geographical location. This operation is simple, and can recommend information to a user in the screen-locked state. This facilitates to improve user experience.

In a possible design, the positioning module includes a GPS positioning module or a Wi-Fi positioning module.

In this embodiment of this application, the foregoing two types of positioning modules are merely examples, and the positioning module may alternatively be another module that can locate the current geographical location. This is not limited in this embodiment of this application.

In a possible design, that the application processor triggers to enable the positioning module includes: determining, by the application processor, a current moving speed of the terminal device; if the moving speed is greater than or equal to a first preset speed, periodically triggering, by the application processor, at a period of a first duration, to enable the positioning module; and if the moving speed is less than the first preset speed, periodically triggering, by the application processor, at a period of a second duration, the positioning module. The first duration is less than the second duration.

In this embodiment of this application, when triggering to enable the positioning module, the application processor may periodically trigger, based on the current moving speed of the terminal device, to enable the positioning module. For example, when the terminal device moves relatively fast, the positioning module is periodically triggered, at a relatively short period, to be enabled. When the terminal device moves relatively slow, the positioning module is periodically triggered at a relatively long period, to be enabled. In this manner, when the terminal device is in the screen-locked state, the positioning module does not need to be always enabled. This facilitates to reduce power consumption, and can recommend information to the user in the screen-locked state.

In a possible design, that the application processor outputs information of the place of interest by using the output device includes: determining, by the application processor, a first application based on the place of interest, and displaying a shortcut on a display screen, where the shortcut is used to open the first application, to display information related to the place of interest.

In this embodiment of this application, the terminal device may display a shortcut, and when triggering the shortcut, the user can open the first application, to display the information related to the place of interest. In this manner, information can be recommended to the user in the screen-locked state, and the recommended information is related to a nearby place of interest (such as a store or a scenic spot) in an application. This facilitates user operations and improves user experience.

In a possible design, that the application processor determines a first application based on the place of interest includes: determining, by the application processor by running a management service application program on the terminal device, the first application corresponding to the place of interest.

In this embodiment of this application, the management service application program on the terminal device may manage different application programs. For example, the management application program knows a function of each application (a locally installed application or an uninstalled application). For example, the management application program knows which applications may be used to obtain travel-related information, and which applications may be used to obtain food-related information. The application processor runs the management service application program, to determine the first application corresponding to the place of interest (such as a store or a scenic spot). In this manner, information can be recommended to the user in the screen-locked state, and the recommended information is related to a nearby place of interest in an application. This facilitates user operations and improves user experience.

In a possible design, the application processor disables the positioning module after the application processor determines, by using the modem, that the terminal device leaves the first cell.

In this embodiment of this application, after determining that the terminal device leaves the first cell, the positioning module is disabled. This facilitates to reduce power consumption.

In a possible design, the application processor may further download cell information of a new cell from the server, and the new cell includes another cell that is located around the first cell and that does not exist in the at least one cell. The application processor stores the downloaded cell information of the new cell.

According to a third aspect, an embodiment of this application provides a terminal device. The terminal device stores cell information of at least one cell, and the at least one cell includes a first cell. The terminal device includes:

a modem, configured to determine a current camping cell of the terminal device when the terminal device is in a screen-locked state;

a coprocessor, configured to trigger to enable the positioning module after determining, based on the camping cell, that the terminal device enters the first cell;

the positioning module, after being triggered and enabled, configured to obtain a first geographical location of the terminal device in the first cell; where after determining that a place of interest exists in a range covered by the first cell and is located near the first geographical location, the coprocessor is further configured to send information of the place of interest to an application processor;

the application processor, configured to control an output device; and the output device, configured to output the information of the place of interest.

In this embodiment of this application, when the terminal device is in the screen-locked state, the application processor and the positioning module do not need to be always in an enabled state, and the coprocessor with relatively low power consumption determines whether the terminal device enters a cell. If the terminal device enters the cell, the coprocessor triggers to enable the positioning module to detect a current geographical location. When determining that a place of interest exists and is located near the geographical location, the coprocessor recommends the place of interest to the user by using the application processor. In a solution provided in this embodiment of this application, power consumption of the coprocessor or the modem is less than power consumption of the application processor or the positioning module. Therefore, in this manner, information is recommended to the user in the screen-locked state, and power consumption is also reduced.

In a possible design, when determining, based on the camping cell, whether the terminal device enters the first cell, the coprocessor is specifically configured to: determine whether the camping cell and the first cell are a same cell; and if the first cell and the camping cell are a same cell, determine that the terminal device enters the first cell.

In a possible design, the terminal device further stores a geographical location of a place of interest covered by each of the at least one cell. When determining whether a place of interest exists in a range covered by the first cell and is located near the first geographical location, the coprocessor is specifically configured to: determine, from all places of interest covered by the first cell, a place of interest whose distance from the first geographical location is less than a preset distance.

In a possible design, the positioning module includes a GPS positioning module or a Wi-Fi positioning module.

In a possible design, when triggering to enable the positioning module, the coprocessor is configured to: determine a current moving speed of the terminal device; if the moving speed is greater than or equal to a first preset speed, periodically trigger, at a period of a first duration, to enable the positioning module; and if the moving speed is less than the first preset speed, periodically trigger, at a period of a second duration, the positioning module. The first duration is less than the second duration.

In a possible design, the application processor is further configured to determine a first application based on the place of interest.

When outputting the information of the place of interest, the output device is specifically configured to: display a shortcut, where the shortcut is used to open the first application, to display information related to the place of interest.

In a possible design, the modem is further configured to determine a new camping cell of the terminal device, and the coprocessor is further configured to trigger to disable the positioning module after determining, based on the new camping cell, that the terminal device leaves the first cell.

In a possible design, the application processor is further configured to download cell information of a new cell from the server, and the new cell includes another cell that is located around the first cell and that does not exist in the at least one cell. The application processor is further configured to store the downloaded cell information of the new cell.

According to a fourth aspect, an embodiment of this application provides a terminal device. The terminal device stores cell information of at least one cell, and the at least one cell includes a first cell. The terminal device includes:

a modem, configured to determine a current camping cell of the terminal device when the terminal device is in a screen-locked state;

an application processor, configured to trigger to enable a positioning module after determining, based on the camping cell, that the terminal device enters the first cell;

the positioning module, after being triggered and enabled, configured to obtain a first geographical location of the terminal device in the first cell; where the application processor is further configured to determine that a place of interest exists in a range covered by the first cell and is located near the first geographical location; and an output device, configured to output information of the place of interest.

In this embodiment of this application, the terminal device first determines that the terminal device enters the first cell, and then searches for a nearby place of interest within coverage of the first cell. This facilitates to improve accuracy of place of interest recommendation. The positioning module does not need to be always enabled. The positioning module is enabled only after the terminal device enters a cell, to detect a current geographical location. This facilitates to reduce power consumption.

In a possible design, when determining, based on the camping cell, whether the terminal device enters the first cell, the application processor is specifically configured to: determine whether the camping cell and the first cell are a same cell; and if the camping cell and the first cell are a same cell, determine that the terminal device enters the first cell.

In a possible design, the terminal device further stores a geographical location of a place of interest covered by each of the at least one cell. When determining whether a place of interest exists in a range covered by the first cell and is located near the first geographical location, the application processor is specifically configured to:

determine, from all places of interest covered by the first cell, a place of interest whose distance from the first geographical location is less than a preset distance.

In a possible design, the terminal device further includes:

a sending device, configured to send a cell ID of the first cell and the first geographical location to a server, where the server determines, based on the cell ID of the first cell and the first geographical location, the place of interest that exists in the range covered by the first cell and is located near the first geographical location; and a receiving device, configured to receive the information of the place of interest sent by the server.

In a possible design, the positioning module includes a GPS positioning module or a Wi-Fi positioning module.

In a possible design, when triggering to enable the positioning module, the application processor is configured to: determine a current moving speed of the terminal device; if the moving speed is greater than or equal to a first preset speed, periodically trigger, at a period of a first duration, to enable the positioning module; and if the moving speed is less than the first preset speed, periodically trigger, at a period of a second duration, the positioning module. The first duration is less than the second duration.

In a possible design, the application processor is further configured to determine a first application based on the place of interest.

When outputting the information of the place of interest, the output device is specifically configured to: display a shortcut, where the shortcut is used to open the first application, to display information related to the place of interest.

In a possible design, the modem is further configured to determine a new camping cell of the terminal device, and the application processor is further configured to disable the positioning module after determining, based on the new camping cell, that the terminal device leaves the first cell.

In a possible design, the application processor is further configured to download cell information of a new cell from the server, and the new cell includes another cell that is located around the first cell and that does not exist in the at least one cell. The application processor stores the downloaded cell information of the new cell.

According to a fifth aspect, an embodiment of this application provides a processor and a memory. The memory is configured to store one or more computer programs. When the one or more computer programs stored in the memory are executed by the processor, the terminal device is enabled to perform the method in the first aspect or in any one of the possible designs of the first aspect. Alternatively, when the one or more computer programs stored in the memory are executed by the processor, the terminal device is enabled to perform the method in the second aspect or in any one of the possible designs of the second aspect. The processor is a coprocessor or an application processor.

According to a sixth aspect, an embodiment of this application further provides a terminal device. The terminal device includes modules/units that perform the method in the first aspect or in any one of the possible designs of the first aspect. Alternatively, the terminal device includes modules/units that perform the method in the second aspect or in any one of the possible designs of the second aspect. These modules/units may be implemented by hardware, or may be implemented by hardware by executing corresponding software.

According to a fifth aspect, an embodiment of this application further provides a computer-readable storage medium. The computer-readable storage medium includes a computer program. When the computer program is run on a terminal device, the terminal device is enabled to perform the method in the first aspect or in any one of the possible designs of the first aspect. Alternatively, when the computer program is run on the terminal device, the terminal device is enabled to perform the method in the second aspect or in any one of the possible designs of the second aspect.

According to a sixth aspect, an embodiment of this application further provides a computer program product. When the computer program product runs on a terminal device, the terminal device is enabled to perform the method in the first aspect or in any one of the possible designs of the first aspect. Alternatively, when the computer program product runs on a terminal device, the terminal device is enabled to perform the method in the second aspect or in any one of the possible designs of the second aspect.

DESCRIPTION OF EMBODIMENTS

The following describes technical solutions in embodiments of this application with reference to the accompanying drawings in the embodiments of this application.

The following describes some terms of the embodiments of this application, to help persons skilled in the art have a better understanding.

(1) A terminal device in the embodiments of this application may also be referred to as user equipment (User Equipment, UE), and the terminal device may be, for example, a smartphone, a tablet computer, various wearable devices, or an in-vehicle device. Various application programs (application, app for short) may be installed in the terminal device, for example, WeChat, Alipay, Ctrip, Meituan, Tencent chat software (QQ), DingTalk, Instagram (instagram), Kakao Talk, and Line (Line).

(2) "A plurality of" in the embodiments of this application indicates "two or more".

In addition, it should be understood that in descriptions of this application, terms such as "first" and "second" are merely used for differentiation and description, but should not be understood as an indication or implication of relative importance or an indication or implication of an order.

Figure 1:
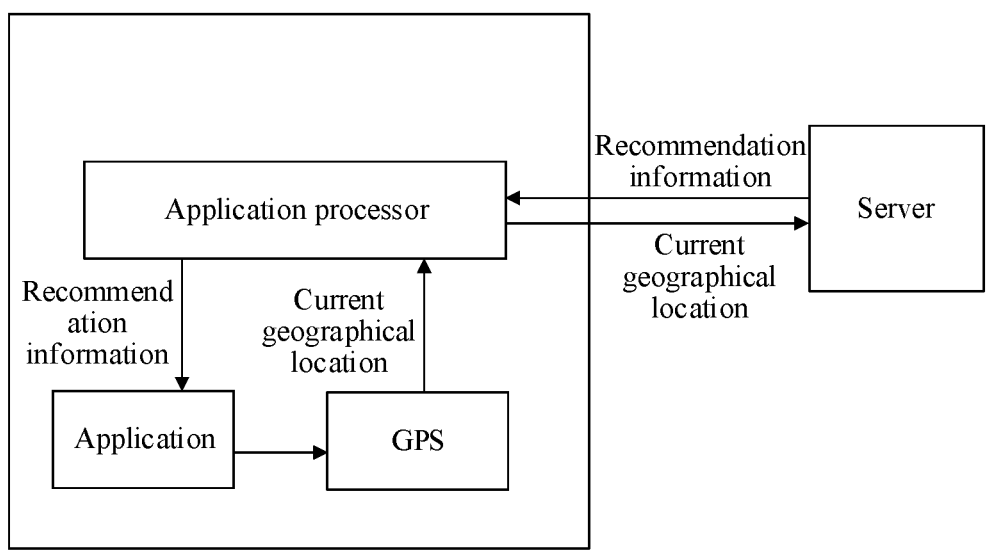
FIG. 1 is a schematic diagram of a process in which a terminal device recommends information to a user by using a specific application program in the prior art.
Figure 2:
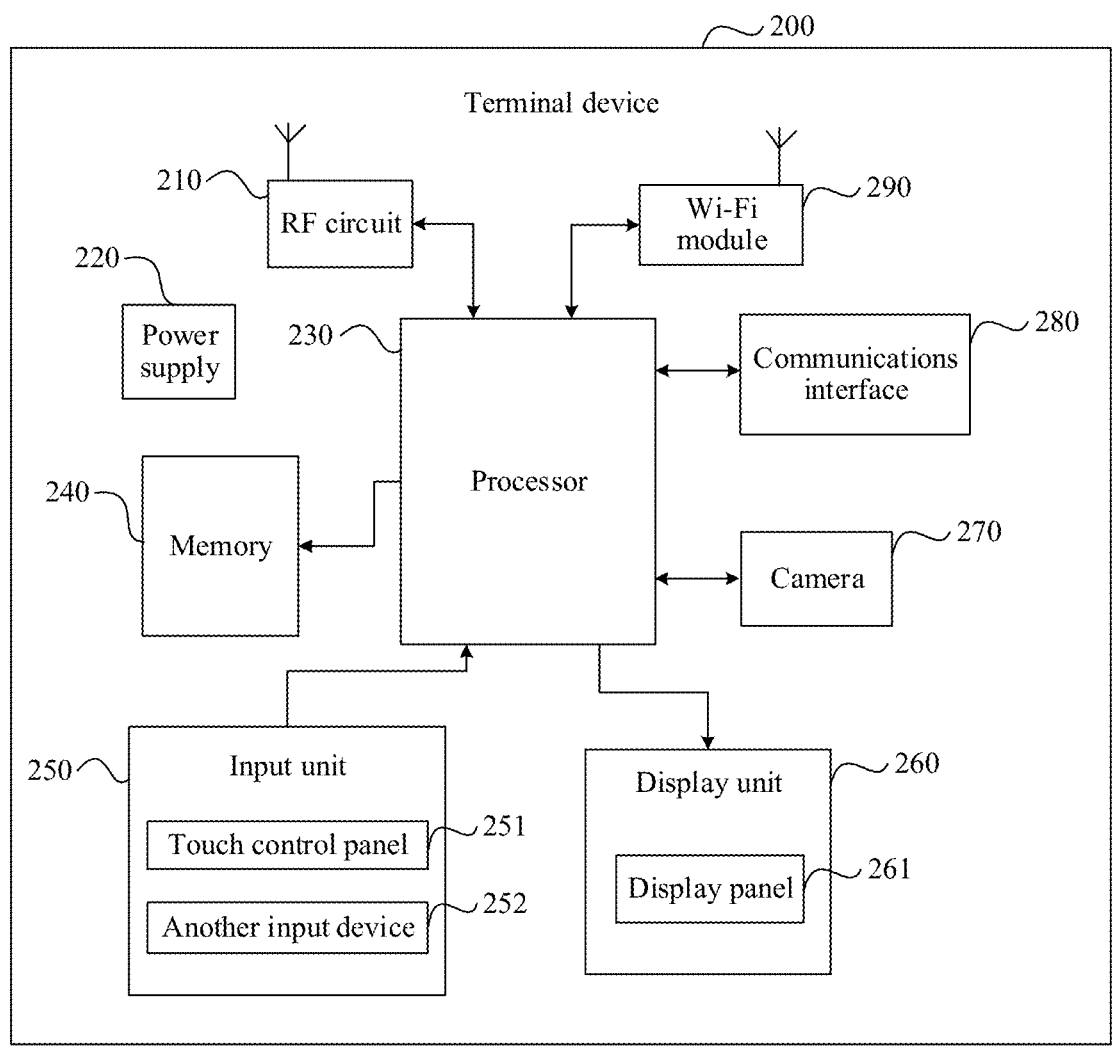
FIG. 2 is a schematic diagram of a structure of a terminal device according to an embodiment of the present invention.

The embodiments of this application provide an information pushing method and a terminal device. The method is applicable to the terminal device. FIG. 2 is a structural diagram of a possible terminal device. Referring to FIG. 2, the terminal device 200 includes components such as a radio frequency (Radio Frequency, RF) circuit 210, a power supply 220, a processor 230, a memory 240, an input unit 250, a display unit 260, a camera 270, a communications interface 280, and wireless fidelity (Wireless Fidelity, Wi-Fi) module 290. It can be understood by a person skilled in the art that a structure of the terminal device shown in FIG. 2 does not constitute a limitation on the terminal device, and the terminal device provided in this embodiment of this application may include more or fewer components than those shown in the figure, combine some components, or have different component arrangements.

The following specifically describes each component of the terminal device 200 with reference to FIG. 2.

The RF circuit 210 may be configured to receive and send data in a communication process or a call process. Specifically, after receiving downlink data from a base station, the RF circuit 210 sends the downlink data to the processor 230 for processing, and sends to-be-sent uplink data to the base station. Generally, the RF circuit 210 includes but is not limited to an antenna, at least one amplifier, a transceiver, a coupler, a low noise amplifier (Low Noise Amplifier, LNA), a duplexer, and the like.

In addition, the RF circuit 210 may further communicate with a network and another device through wireless communication. Any communications standard or protocol may be used for wireless communication, including but not limited to Global System for Mobile Communications (Global System of Mobile Communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, short message service (Short Messaging Service, SMS) protocol, and the like.

A Wi-Fi technology belongs to a short-range wireless transmission technology. The terminal device 200 may be connected to an access point (Access Point, AP) by using the Wi-Fi module 290, to access a data network. The Wi-Fi module 290 may be configured to receive and send data in a communication process.

The terminal device 200 may be physically connected to another device by using the communications interface 280. Optionally, the communications interface 280 is connected to a communications interface of the another device by using a cable, to implement data transmission between the terminal device 200 and the another device.

If the terminal device 200 needs to implement a communication service and send information to another contact, the terminal device 200 needs to have a data transmission function, that is, the terminal device 200 needs to include a communications module inside. Although FIG. 2 shows communications modules such as the RF circuit 210, the Wi-Fi module 290, and the communications interface 280, it may be understood that the terminal device 200 includes at least one of the foregoing components or another communications module (for example, a Bluetooth module) configured to implement communication, to transmit the data. For example, when the terminal device 200 is a mobile phone, the terminal device 200 may include the RF circuit 210, and may further include the Wi-Fi module 290. When the terminal device 200 is a computer, the terminal device 200 may include the communications interface 280, and may further include the Wi-Fi module 290. When the terminal device 200 is a tablet computer, the terminal device 200 may include the Wi-Fi module.

The memory 240 may be configured to store a software program and a module. The processor 230 runs the software program and the module stored on the memory 240, to execute various function applications of the terminal device 200 and process data.

Optionally, the memory 240 may mainly include a program storage area and a data storage area. The program storage area may store an operating system, various application programs, and the like. The data storage area may store data (for example, multimedia files such as various pictures and video files) created according to use of the terminal device, and the like.

In addition, the memory 240 may include a high-speed random access memory, and may further include a non-volatile memory, for example, at least one magnetic disk storage device, a flash memory, or another volatile solid-status storage device.

The input unit 250 may be configured to receive numeral or character information input by the user, and generate key signal input related to a user setting and function control of the terminal device 100.

Optionally, the input unit 250 may include a touch panel 251 and another input device 252.

The touch panel 251, also referred to as a touchscreen, may collect a touch operation (for example, an operation performed by a user on the touch panel 251 or near the touch panel 251 by using any proper object or accessory such as a finger or a stylus) performed by the user on or near the touch panel, and drive a corresponding connection apparatus based on a preset program. Optionally, the touch panel 251 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 230, and can receive and execute a command sent by the processor 230. In addition, the touch panel 251 may be implemented in a plurality of types such as a resistive type, a capacitive type, an infrared type, and a surface acoustic wave type.

Optionally, the another input device 252 may include but is not limited to one or more of a physical keyboard, a function key (for example, a volume control button or a power on/off button), a tracking ball, a mouse, a joystick, and the like.

The display unit 260 may be configured to display information input by the user, information provided for the user, and various menus of the terminal device 200. The display unit 260 is a display system of the terminal device 200, and is configured to present a screen to implement human-computer interaction.

The display unit 260 may include a display panel 261. Optionally, the display panel 261 may be configured in a form of a liquid crystal display (Liquid Crystal Display, LCD) screen, an organic light emitting diode (Organic Light-Emitting Diode, OLED), or the like.

Further, the touch panel 251 may cover the display panel 261. After detecting touch operation on or near the touch panel 251, the touch panel 251 transfers information about the touch operation to the processor 230 to determine a touch event type. Subsequently, the processor 230 provides corresponding visual output on the display panel 261 based on the touch event type.

Although in FIG. 2, the touch panel 251 and the display panel 261 serve as two discrete components to implement input and input functions of the terminal device 200. However, in some embodiments, the touch panel 251 may be integrated into the display panel 261 to implement the input and output functions of the terminal device 200.

The processor 230 is a control center of the terminal device 200, connects to the components by using various interfaces and lines, and runs or executes the software program and/or the module stored on the memory 240 and invokes the data stored on the memory 240, to perform various functions of the terminal device 200 and process the data, and implement a plurality of services based on the terminal device.

Optionally, the processor 230 may include one or more processing units. Optionally, the processor 230 may integrate an application processor and a modem processor. The application processor mainly processes an operating system, a user interface, an application program, and the like. The modem processor mainly processes the radio communications. It may be understood that the modem processor may alternatively not be integrated into the processor 230.

The camera 270 is configured to implement a photographing function of the terminal device 200, to photograph a picture or a video. The camera 270 may further be configured to implement a scanning function of the terminal device 200, and scan a scanning object (a two-dimensional code/bar code).

The terminal device 200 further includes the power supply 220 (such as a battery) configured to supply power to the components. Optionally, the power supply 220 may be logically connected to the processor 230 by using a power management system, to implement functions such as charge management, discharge management, and power consumption management by using the power management system.

Although not shown, the terminal device 200 may further include at least one sensor, an audio circuit, and the like.

Embodiments of this application provide an information pushing method and a terminal device. In the method, when the terminal device is in the screen-locked state, a current geographical location may be obtained, and then a place of interest near the geographical location is pushed to the user according to the geographical location. Without a need for the user to open a specific application program, or even without a need for the user to unlock the screen, the terminal device can obtain related information of a nearby place of interest in the screen-locked state. This facilitates user operations and improves user experience. There may be a plurality of places of interest herein, for example, a scenic spot, an entertainment place, a store, and the like. The following describes an example in which the places of interest are a scenic spot and a store.

In this embodiment of this application, the screen-locked state may be a screen-locked and screen-off state or a screen-locked and screen-on state. A mobile phone is used as an example. The screen-locked and screen-off state is that the mobile phone is locked and the screen is not turned on, that is, the mobile phone is in a black screen state. The screen-locked and screen-on state is that the mobile phone is locked, but the screen is turned on, for example, a slide-to-unlock screen or a password input screen displayed on the mobile phone.

In the screen-locked and screen-off state, the application processor of the terminal device may be in a sleep state or in a wakeup state. In the screen-locked and screen-on state, the application processor of the terminal device is in the wakeup state. Therefore, in this embodiment of this application, a processing process of the terminal device in the screen-locked and screen-off state may be different from a processing process of the terminal device in the screen-locked and screen-on state. The following first describes a processing process in which the terminal device is in the screen-locked and screen-off state.

Figure 3:
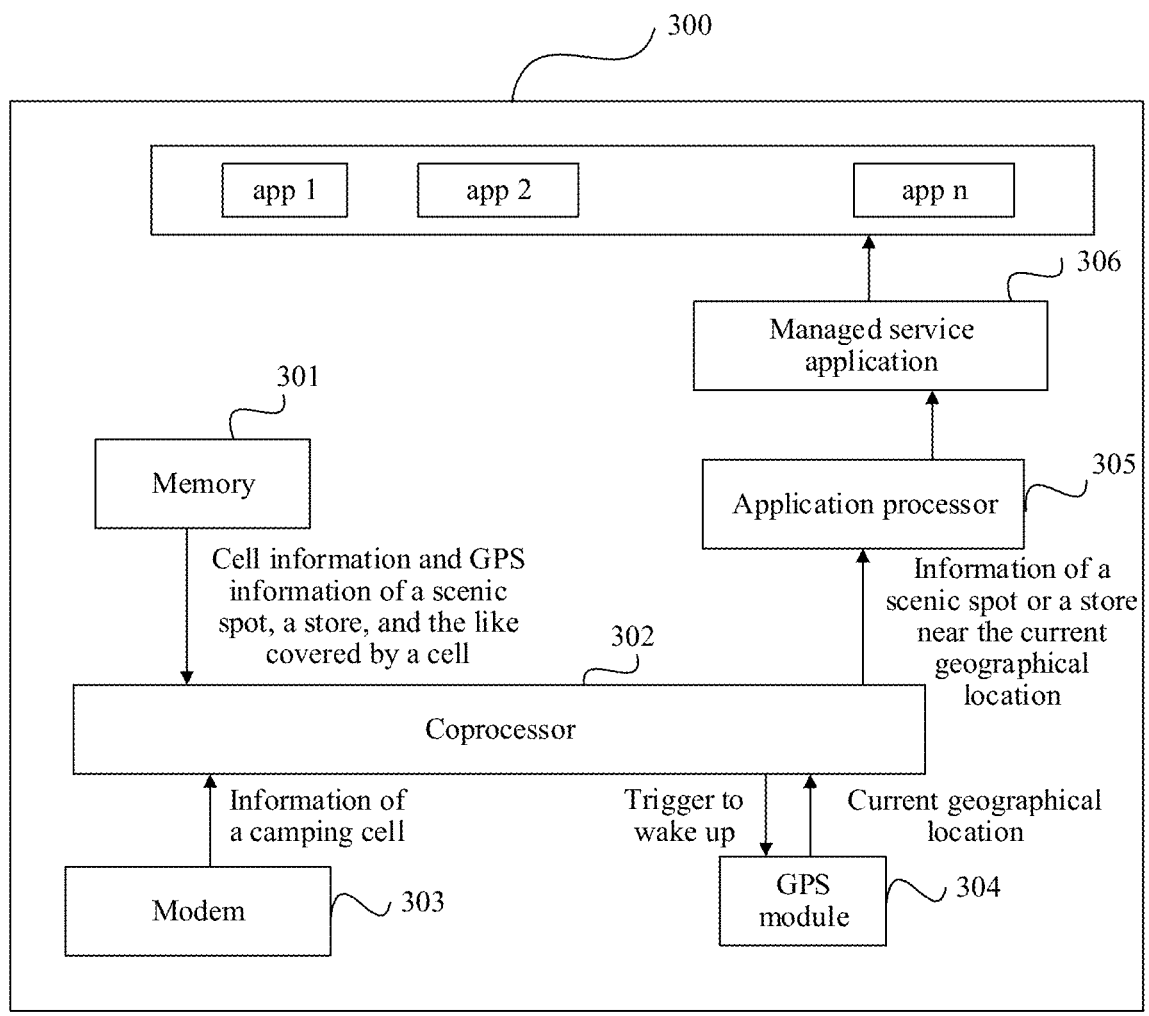
FIG. 3 is a schematic diagram of a structure of a terminal device according to an embodiment of the present invention.

FIG. 3 is a schematic diagram of a structure of a terminal device according to an embodiment of this application. In FIG. 3 is an example in which the terminal device 300 is in the screen-locked and screen-off state, and the application processor is in a sleep state.

As shown in FIG. 3, the terminal device 300 includes a memory 301, a coprocessor 302, a modem (modem) 303, a GPS module 304, and an application processor 305. In this embodiment of this application, the coprocessor 302 may be a sensor hub (sensor hub) coprocessor, or may also be another coprocessor. This is not limited in this embodiment of this application.

It should be noted that, in this embodiment of this application, in the screen-locked and screen-off state, the GPS module 304 may be in a sleep state or an off state (the following mainly uses an example in which the GPS module 304 is in the off state), the application processor 305 is in a sleep state, and the coprocessor 302 and the modem 303 are in an on state.

Figure 4:
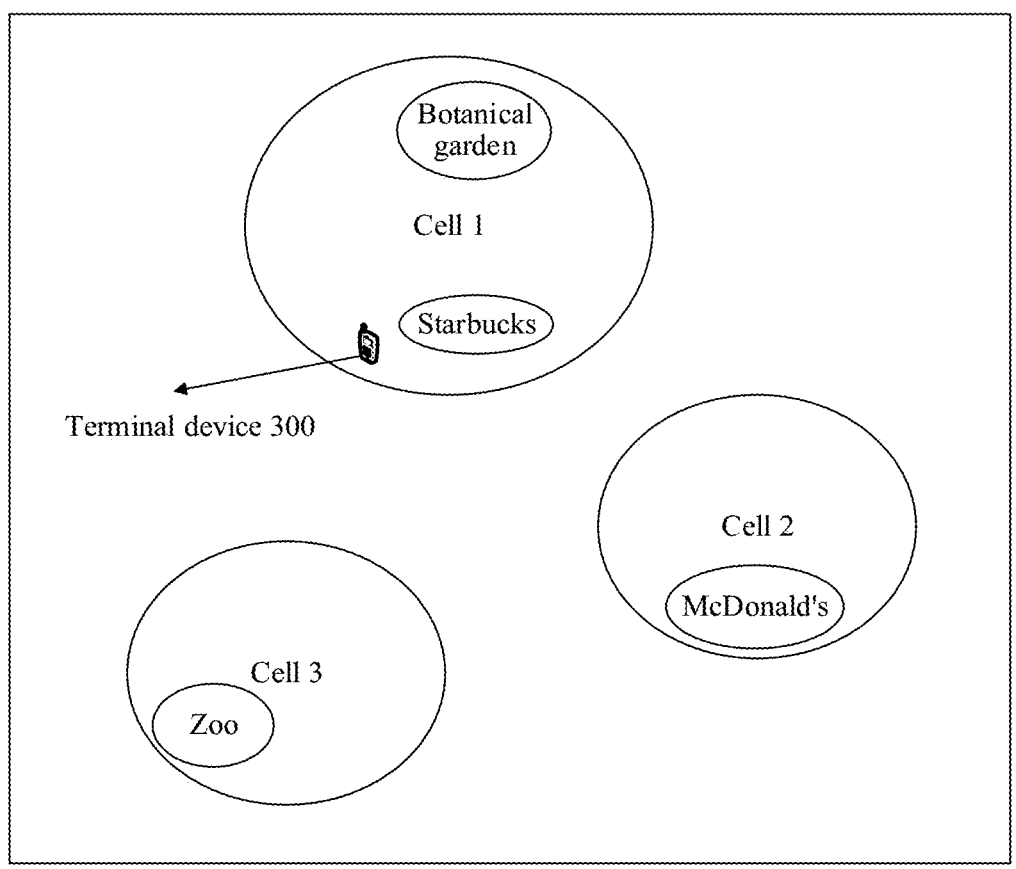
FIG. 4 is a schematic diagram of a plurality of cells stored in a terminal device according to an embodiment of the present invention.

The memory 301 stores cell information of some cells and GPS information of places such as scenic spots and stores covered by each of the cells (the information stored in the memory 301 may be updated, and an update process is described subsequently). Referring to FIG. 4, the memory 301 may store cell information of each of a plurality of cells (cells 1 to 3) in a form of a map (for example, the cell information is a cell ID, a cell ID of a cell 1 is a cell ID 1, a cell ID of a cell 2 is a cell ID 2, and a cell ID of a cell 3 is a cell ID 3), and a location of a scenic spot or a store covered by each cell.

The modem 303 is configured to search for a cell, and when a suitable cell is found, the modem 303 camps on the cell. The modem 303 may store a cell ID of a current camping cell of the terminal device 300 for use.

The coprocessor 302 is connected to the modem 303, and may read a cell ID of a camping cell stored in the modem 303. The coprocessor 302 may further search the map stored in the memory 301 for a cell that is the same as the camping cell. For example, the coprocessor 302 may search the map for a cell whose cell ID is the same as the cell ID of the camping cell. If there is a cell whose cell ID is the same as the cell ID of the camping cell, the coprocessor 302 determines that the terminal device 300 enters a prestored cell. For example, if the coprocessor 303 in the terminal device 300 reads that a cell ID of a camping cell stored in the modem 303 is a cell ID 1, and the coprocessor 302 finds, from the map stored in the memory 301, a cell corresponding to the cell ID 1, that is, the cell 1, the terminal device 300 enters the cell 1. Refer to FIG. 4.

When determining that the terminal device 300 enters the cell 1, the coprocessor 302 triggers to enable the GPS module 304. After being enabled, the GPS module 304 obtains a current geographical location, and then sends the geographical location to the coprocessor 302. The coprocessor 302 searches, based on the geographical location, the memory 301 for all scenic spots or shops covered by the cell 1, and determines whether a scenic spot or a store near the geographical location exists. (It may be determined, based on whether a distance between the geographical location and the scenic spot or the store is less than a preset distance threshold, whether there is a scenic spot or a store near the geographical location). If there is a scenic spot or a store near the geographical location, the coprocessor 302 triggers to wake up the application processor 305, and sends information of the scenic spot, the store, and the like near the geographical location to the application processor 305. The application processor 305 further pushes the information to the user (the information is displayed on a display screen, or broadcast by using a speaker. For example, a language broadcast control is displayed on the display screen, and when the user triggers the broadcast control, the terminal device broadcasts the information). For example, referring to FIG. 4, the coprocessor 302 in the terminal device 300 determines that the terminal device 300 enters the cell 1, and in a range of the cell 1, there is a Starbucks near a current geographical location of the terminal device 300. The coprocessor 302 sends information of the Starbucks to the application processor 305. The application processor 305 further pushes the information of Starbucks to the user.

The following describes two examples in which the terminal device 300 recommends information to the user on the display screen.

In a first example, the application processor 305 may display simple information (for example, a name) of a nearby store or scenic spot on a display screen. When the terminal device 300 detects an operation that a user triggers a name of a scenic spot, the application processor 305 invokes a management service application program 306. The management service application program 306 invokes an app corresponding to the scenic spot, and then detailed information related to the scenic spot in the app is displayed on the display screen. For example, when invoking a corresponding app, the management service application program 306 may invoke an app related to a location or a name of a scenic spot or a store. For example, if there is a scenic spot in the recommendation information, the management service application program 306 may invoke an app related to the scenic spot, for example, a Ctrip app. The management service application program 306 herein is configured to manage each app in the terminal device 300. For example, the management service application program 306 knows a name, a function, and the like of each app. Optionally, the management service application 306 may further invoke a corresponding app or web page from the server based on information such as a place or a name of a scenic spot or a store, so that the corresponding app or web page feeds back, based on the information, detailed information of the scenic spot or the store, for example, scenic spot introduction, store product introduction, and purchase link. According to a preset policy of invoking an app, the management service application 306 may know which app is associated with the information of the scenic spot or the store.

Figure 5:
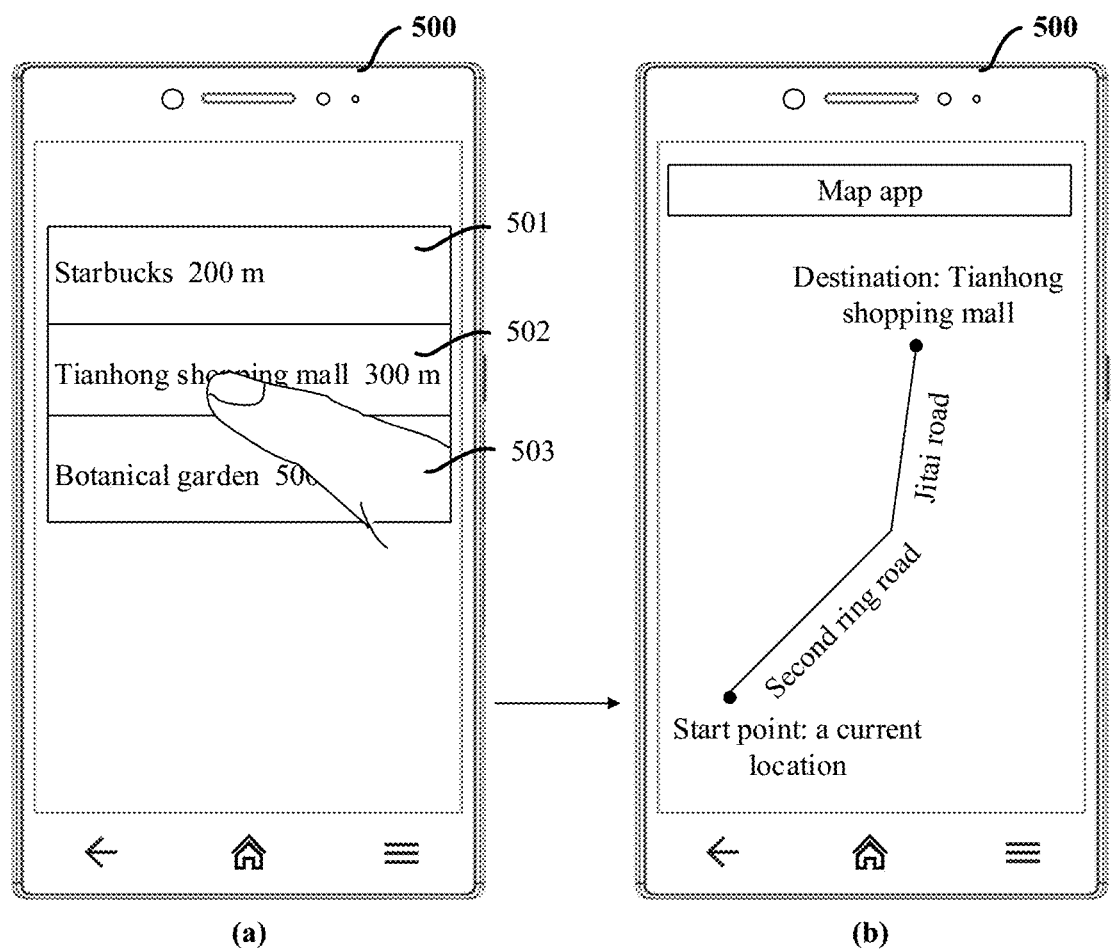
FIG. 5 is a schematic diagram of a display state of a display screen of a mobile phone according to an embodiment of the present invention.

Referring to FIG. 5, a mobile phone is used as an example. In FIG. 5 (a), in a screen-locked state, the mobile phone 500 recommends three nearby places to the user, and names of the three places are respectively Starbucks 501, tianhong shopping mall 502, and botanic garden 503. When the user triggers a name, the mobile phone 500 invokes a corresponding app by running a management service application program. For example, the user triggers the tianhong shopping mall 502. The mobile phone 500 invokes, by running a management service application program, an app related to the tianhong shopping mall 502, for example, a map app. Then, the mobile phone 500 opens and displays a map app, and displays a route that is obtained by searching the map app and that is from a start point to a tianhong shopping mall.

In a second example, the application processor 305 may further display relatively detailed information (for example, detailed information of a store or a scenic spot found in an app or a web page) of a nearby store or scenic spot on the display screen. For example, the information is displayed by using a shortcut of an app or a web page. When the user triggers the shortcut, the terminal device 300 opens a related app or web page to view more information. For example, after the terminal device 300 determines a store or a scenic spot near a current geographical location in a cell, the terminal device 300 runs the management service application 306. After the terminal device 300 invokes a corresponding app by using the management service application 306, the terminal device 300 searches the app for detailed information related to the store or the scenic spot. The detailed information related to the store or the scenic spot found by using the app is displayed on the screen. Alternatively, the management service application 306 may further invoke a corresponding app or web page from the server based on information such as a place or a name of a scenic spot or a store. In this way, the corresponding app or web page feeds back detailed information of the scenic spot or the store based on the information. The terminal device 300 displays the detailed information of the scenic spot or the store that is fed back by the app or web page based on the information on the display screen.

Figure 6:
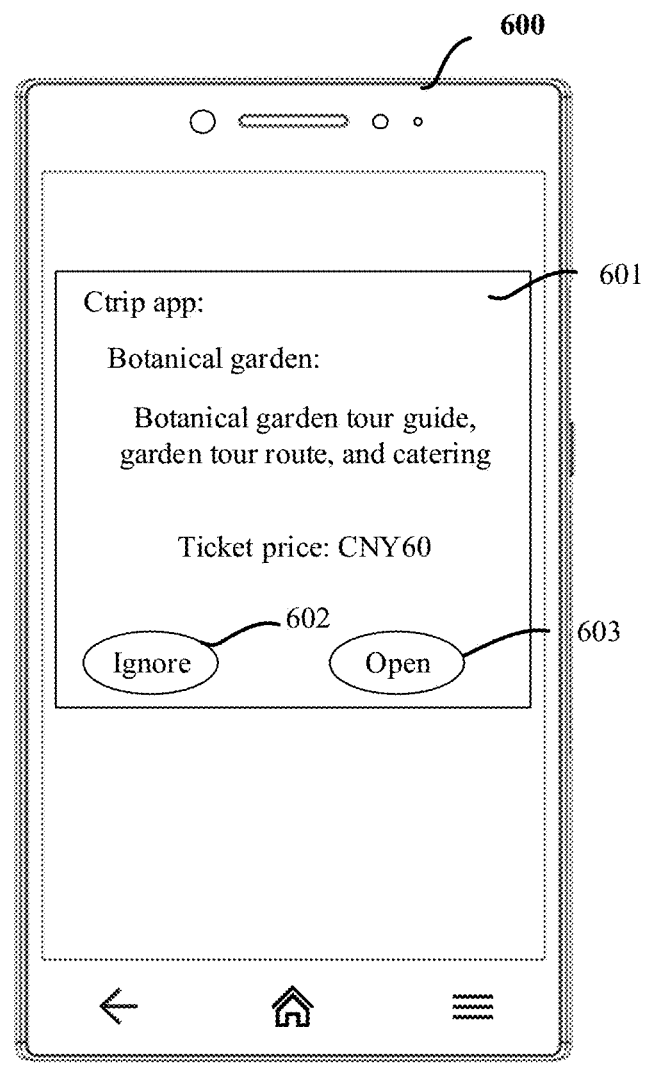
FIG. 6 is a schematic diagram of a display state of a display screen of a mobile phone according to an embodiment of the present invention.

Referring to FIG. 6, a mobile phone is used as an example. A shortcut 601 of a Ctrip app is displayed on a display screen of a mobile phone 600, and the shortcut 601 includes related information of a botanical garden. When the user triggers a control "open" 603, the mobile phone opens the Ctrip app, and displays more detailed information related to the botanical garden in the Ctrip app. When the user triggers a control "ignore" 603, the mobile phone closes the shortcut 601.

It should be noted that, in the second example, in the screen-locked state, because the terminal device needs to display the detailed information of the store or the scenic spot found in the app, the terminal device needs to be in a network connected state. For example, data traffic is enabled or Wi-Fi is connected. That is, when running the Ctrip app, the mobile phone can search the Ctrip app for information related to the scenic spot by using the data traffic or the Wi-Fi. In the first example, in the screen-locked state, the terminal device displays only the name of the store or the scenic spot. In this case, the terminal device may not need to connect to a network. However, when the user triggers the name of the scenic spot or the store, the terminal device needs to prompt the user to connect to the network, to search for the information related to the scenic spot or the store in the corresponding app.

In this embodiment of this application, the management service application program 306 may be an application program that is installed in the terminal device 300 and that is set before delivery of the terminal device 300. Alternatively, the management service application program 306 may be installed or set by the user in a process of using the terminal device 300. For example, an application program selected from a plurality of application programs installed on the terminal device 300 is used as the management service application program 306.

The foregoing describes an example in which the memory 301 already stores cell information of some cells and GPS information of places such as scenic spots and stores covered by each of the cells. In actual application, the memory 301 may also store only cell information of a cell, for example, a cell ID. In this case, because the terminal device 300 does not store the scenic spot or the store covered by the cells, the terminal device 300 may obtain the information of the shop or the scenic spot within the cell from the server.

For example, after obtaining the current camping cell of the terminal device 300 by using the modem 303, the coprocessor 302 may determine, based on the cell information stored in the memory 301, whether a cell that is the same as the camping cell exists. If a cell (for example, a cell 1) that is the same as the camping cell exists, the coprocessor 302 determines that the terminal device 300 enters a range of the cell, that is, the cell 1. Then, the coprocessor 302 triggers to enable the GPS module 304, to locate a current first geographical location by using the GPS module 304. The coprocessor 302 sends the cell ID of the cell 1 and the first geographical location to the application processor 305 (in the screen-locked and screen-off state, the coprocessor 302 triggers to wake up the application processor 305, and sends the cell ID of the cell 1 and the first geographical location to the application processor 305). The application processor 305 sends the cell ID of the cell 1 and the first geographical location to the server by using the RF circuit 110. The server determines, based on the cell ID of the cell 1 and the first geographical location, the information of the store or the scenic spot that is located near the first geographical location and within a coverage of the cell 1. The application processor 305 receives, by using the RF circuit 110, the information of the store or the scenic spot that is determined by the server, and then the application processor 305 recommends the information of the store or the scenic spot to the user.

Optionally, the server may feed back only the name of the scenic spot or the store within the cell 1 to the application processor 305. After obtaining the name, the application processor 305 may recommend information of the scenic spot or the store to the user according to the foregoing two examples.

Optionally, the server may also send detailed information (for example, detailed information of a store or a scenic spot found by using an app or a web page) of the scenic spot or the store within the cell 1 to the application processor 305. After the application processor 305 obtains the detailed information of the scenic spot or the store, the detailed information of the scenic spot or the store may be directly displayed.

It can be learned from the foregoing descriptions that in this embodiment of this application, the terminal device 300 first determines, based on information of the camping cell, that the terminal device 300 enters the cell 1, then detects a relatively accurate geographical location by using the GPS module, and then determines, within the coverage of the cell 1, a scenic spot or a store near the geographical location. To reduce power consumption, after the terminal device 300 enters the cell 1, the GPS module may be periodically enabled. Within a time period in which the GPS module is enabled, the current geographical location of the terminal device 300 is detected.

The modem 303 in the terminal device 300 may detect, in real time, whether the camping cell changes. During a period in which the modem 303 determines that the terminal device 300 leaves the cell 1 but does not enter another prestored cell such as the cell 2, the terminal device 300 may disable the GPS module 304 or control the GPS module 304 to be in a sleep state, to reduce power consumption. When the modem 303 determines that the terminal device 300 enters the cell 2 (the camping cell is the cell 2), the terminal device 300 may enable or wake up the GPS module 304, to determine, within a coverage of the cell 2, a store or a scenic spot located near the terminal device 300.

Because power consumption of the coprocessor or the modem is far less than that of the GPS module or the application processor, in this embodiment of this application, when the terminal device is in the screen-locked state, the GPS module and the application processor do not need to be always enabled. A coprocessor with relatively low power consumption may be used to determine whether the terminal device enters a cell. If the terminal device enters a cell, the GPS is periodically enabled to detect the current geographical location. Only when the coprocessor determines that a scenic spot and a shop near the geographical location exists, the coprocessor triggers to wake up the application processor, to recommend the scenic spot or the store to the user by using the application processor. Therefore, in the solution provided in this embodiment of this application, information is recommended to the user in the screen-locked state and power consumption can be relatively low.

It may be understood that, when the terminal device 300 is in the screen-locked and screen-off state, the application processor 305 may also be in a wakeup state, that is, an operating state. A function of the coprocessor 302 may also be executed by the application processor 305. For details, refer to the following embodiment.

The foregoing describes an example in which the terminal device 300 shown in FIG. 3 is in the screen-locked and screen-off state. Because in the screen-locked and screen-on state, the application processor 305 of the terminal device is in the wakeup state, the terminal device may also perform a same processing process (the foregoing processing process) as in the screen-locked and screen-off state. Alternatively, in the screen-locked and screen-on state, because the application processor 305 is woken up, the function of the coprocessor 302 may also be executed by the application processor 305. The application processor 305 may be separately connected to the modem 303 and the memory 301 (not shown in FIG. 3). The application processor 305 reads cell information of the camping cell from the modem 303, and then searches the memory 301 and determines whether a cell that is the same as the camping cell exists. If the cell exists, the application processor 305 triggers to enable the GPS module 304, to obtain the current geographical location. Then, the application processor 305 searches for, within a coverage of the cell, a scenic spot or a store near the geographical location, and recommends information of the scenic spot or the store to the user.

Figure 7:
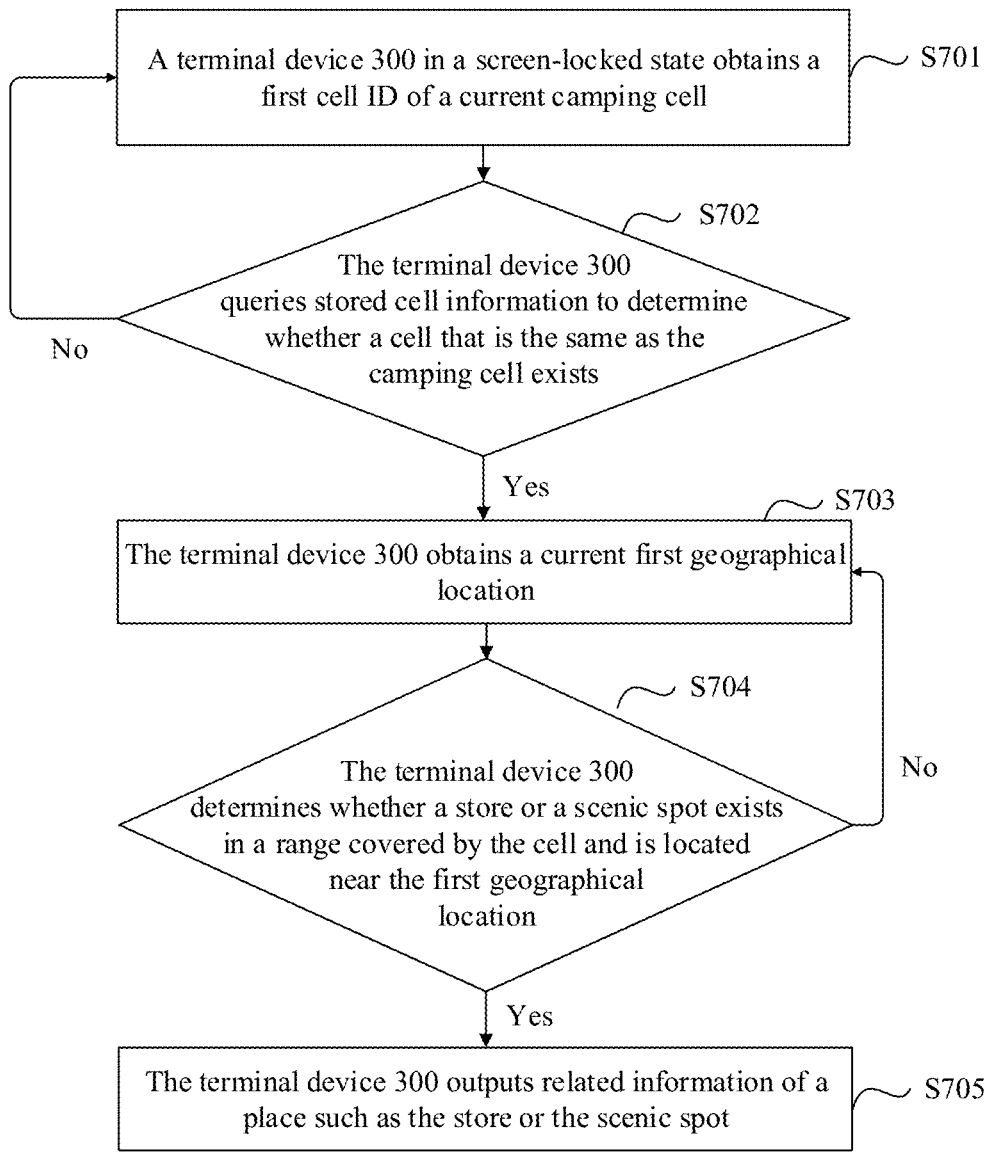
FIG. 7 is a flowchart of an information pushing method according to an embodiment of the present invention.

The information pushing method provided in this embodiment of this application is applicable to the terminal device 200 shown in FIG. 2 or the terminal device 300 shown in FIG. 3. Therefore, in the following description, the terminal device 300 is used as an example for description. FIG. 7 is a flowchart of an information pushing method according to an embodiment of this application. As shown in FIG. 7, a procedure of the method includes the following steps.

S701: In a screen-locked state, a terminal device 300 obtains a cell ID of a current camping cell.

It can be learned from the foregoing content that the screen-locked state may be the screen-locked and screen-off state or the screen-locked and screen-on state. In the embodiment shown in FIG. 7, a same processing process, that is, the processing process shown in FIG. 3, is performed in the screen-locked and screen-off state or in the screen-locked and screen-on state.

In this embodiment of this application, in the screen-locked state, the terminal device 300 may search for a cell in real time (for example, search for a cell with better channel quality). Once the terminal device 300 finds a suitable cell, the terminal device 300 may camp on the cell. As described above, the modem 303 in the terminal device 300 may perform a process of searching for a cell and camping on the cell. When the terminal device 300 camps on a cell, the modem 303 may store a cell ID of the cell.

It should be noted that the cell ID is merely an example in this embodiment of this application, and another cell identifier that can uniquely identify a cell can be used.

S702: The terminal device 300 queries stored cell information to determine whether a cell that is the same as the camping cell exists. If the cell exists, perform S703, or if the cell does not exist, return to S701.

As described above, the memory 301 in the terminal device 300 pre-stores cell information (for example, a cell ID) of some cells and GPS information of places such a scenic spot or a store covered by information of each cell in these cells. For example, the memory 301 may store the information in a plurality of forms, for example, in a form of a map, as shown in FIG. 4. Certainly, for example, the memory 301 may further store the information in another form, such as a table. For example, Table 1 lists cell information stored in the terminal device 300.

TABLE 1

| Cell | Cell ID | Scenic spots/stores covered by the cell | GPS information |
|---|---|---|---|
| Cell 1 | Cell ID 1 | Starbucks | (X1, Y1, Z1) |
|  |  | Botanical garden | (X2, Y2, Z2) |
| Cell 2 | Cell ID 2 | Palace museum | (X3, Y3, Z3) |

As shown in Table 1, the terminal device 300 stores cell information of two cells. The cell ID of the cell 1 is the cell ID 1, and the scenic spots/stores covered by the cell 1 includes a Starbucks and a botanical garden. Table 1 further includes respective GPS information of the Starbucks and the botanical garden, that is, respective geographical location coordinates corresponding to the Starbucks and the zoo. Table 1 is merely an example, and does not limit the cell ID and the GPS information. For example, Table 1 merely exemplarily describes that the GPS information is a coordinate point, but actually, the GPS information may also be a geographical range. For another example, Table 1 merely exemplarily describes that different cells are identified by using cell IDs. Actually, different cells may also be distinguished by using other cell identifiers.

In this embodiment of this application, it is less likely that the terminal device 300 stores cell information of all the cells and information of scenic spots or stores covered by each cell in the memory 301. Therefore, the terminal device 300 may update the information, that is, update Table 1. For example, the terminal device 300 may periodically download, from a server, the cell information and the information of the scenic spots or the stores covered by each cell.

Figure 8:
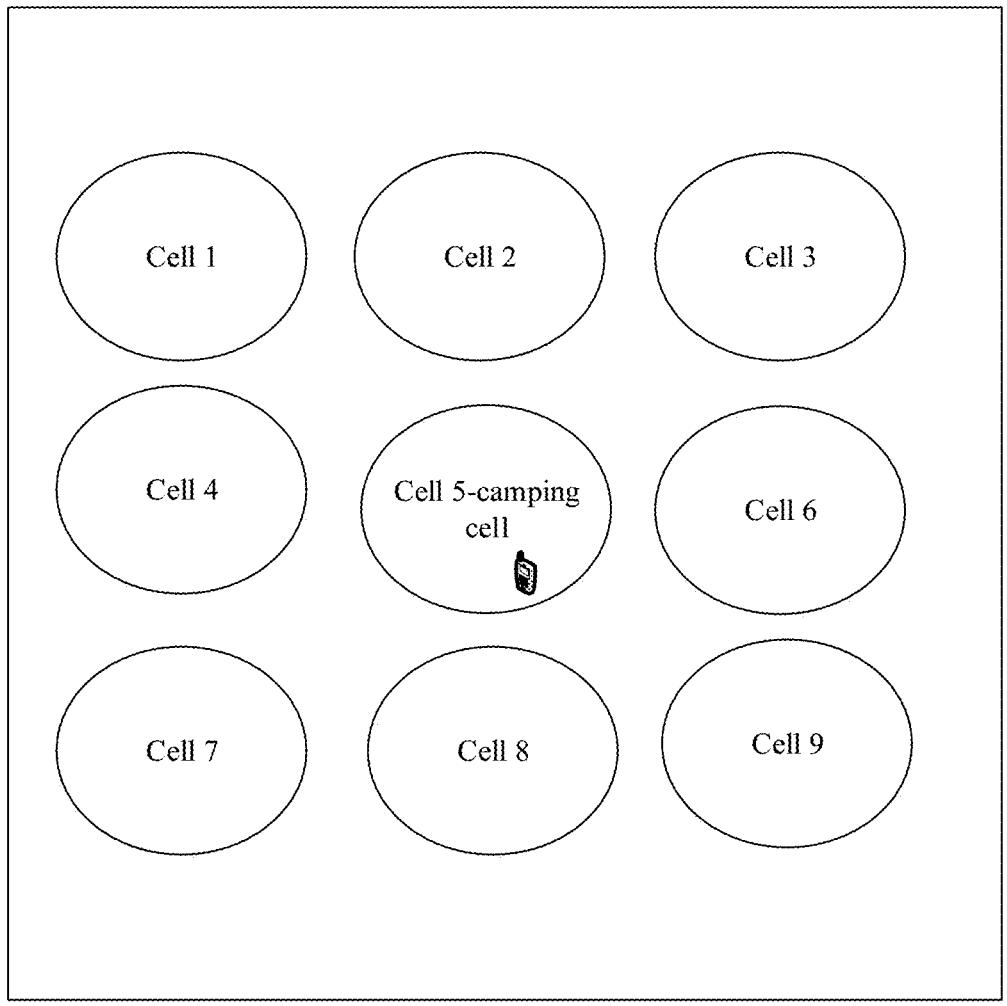
FIG. 8 is a schematic diagram of a plurality of cells stored in a terminal device according to an embodiment of the present invention.

For example, referring to FIG. 8, each time the terminal device 300 downloads, from the server, the cell information and the information of the scenic spots or the stores covered by each cell, the terminal device 300 may download cell information of several more cells, for example, cell information of nine cells (a camping cell and eight cells that are centered on and around the camping cell) and related information of places such as a scenic spot or a store covered by each cell are downloaded from the server. Generally, it takes a relatively long time for the terminal device 300 to move from a cell 5 (the camping cell) to another surrounding cell (a cell in the other eight cells). Therefore, a manner that the terminal device 300 downloads cell information of a plurality of cells at a time can ensure that the downloaded cell information is available for a relatively long time. In other words, the terminal device 300 can use the cell information of the nine cells in a relatively long time period, and does not need to re-download the cell information. It can be understood that, if the server stores cell information of the camping cell, the terminal device may download the cell information of the camping cell before entering the camping cell. Alternatively, after entering the camping cell, the terminal device requests the server to download cell information of the current camping cell and cells around the camping cell. It may be understood that the serve does not store cell information of all cells, and the server provides information of some cells, for example, cell information of a cell including a scenic spot. In other words, a cell corresponding to the cell information stored on the terminal device may be a neighboring cell, or may be a non-neighboring cell, and cells can be far away from each other.

Optionally, when the camping cell of the terminal device 300 changes to a cell 6, and the terminal device 300 camps on the cell 6 for a relatively long time, the terminal device 300 may download, from the server again, cell information of three cells (three cells that are of eight cells around the cell 6 and that are other than the cells 2, 3, 5, 8, and 9) and information of a scenic spots or a store covered by each of the three cells, to update Table 1.

In an example, the terminal device 300 is usually in a screen-locked state for a relatively short time. The terminal device 300 may download, from the server in a process in which the user processes a service by using the terminal device 300 (the application processor 130 is in the wakeup state), cell information and information of a scenic spot or a store covered by each cell. Specifically, the application processor 305 reads the cell information of the camping cell in the modem 303, downloads cell information of the nine cells and information of a scenic spot or a store covered by each cell from the server, and stores the foregoing information in the memory 301. When the terminal device 300 is in the screen-locked state, the application processor 305 is in a sleep state, and the information stored in the memory 301 may be used by the coprocessor 302. Therefore, in this manner, the cell information and the information of the scenic spot or the store covered by each cell from the server may be downloaded by the terminal device 300 when the user uses the terminal device 300 to process a service, for use of the coprocessor 302 in the screen-locked state.

In still another example, it can be learned from the foregoing content that, in the screen-locked and screen-off state, the GPS module 304 in the terminal device 300 is in an off state, the application processor 305 is in a sleep state by default, and the coprocessor 302 and the modem 303 are in a wakeup state. Therefore, in this embodiment of this application, in the screen-locked and screen-off state, when the modem 303 detects that the camping cell of the terminal device 300 changes, the modem 303 may send cell information of a new camping cell to the coprocessor 302. When receiving the cell information of the new camping cell, the coprocessor 302 triggers to wake up the application processor 305. The application processor 305 downloads, from the server, information of a scenic spot, a store, and the like covered by the new camping cell. Alternatively, the application processor 305 may download, in a manner shown in FIG. 6, cell information of a plurality of cells and information of a scenic spot, a store and the like covered by each cell. Once the information is downloaded successfully, the application processor 305 is disabled or the application processor 305 is controlled to be in the sleep state. In this manner, when the terminal device 300 is in the screen-locked state (a screen-locked and screen-off state), the terminal device 300 may also download, from the server in real time, cell information and information of a scenic spot, a store, and the like covered by each cell.

In another example, in the screen-locked and screen-off state, the application processor 305 in the terminal device 300 may alternatively be periodically woken up. After being woken up, the application processor 305 may download, from the server, the cell information and the information of the scenic spot or the store covered by each cell. In the screen-locked and screen-on state, because the application processor 304 is in the wakeup state, the application processor 305 may also periodically download, from the server, the cell information and the information of the scenic spot or the store covered by each cell.

In this embodiment of this application, after obtaining a cell ID of the current camping cell, the terminal device 300 queries, in the cell information stored in the memory 301, whether a cell that is the same as the camping cell exists. For example, the terminal device 300 queries, in stored cell information, whether a cell whose cell ID is the same as the cell ID of the camping cell exists. Table 1 is used as an example. The terminal device 300 determines whether a cell that has a same ID as the cell ID of the camping cell exists in Table 1. If the cell exists, S703 may be performed. If the cell does not exist, return to S701.

S703: The terminal device 300 obtains a current first geographical location.

In this embodiment of this application, after the terminal device 300 finds, in the stored cell information, a cell that is the same as the camping cell, the terminal device 300 may further detect the current first geographical location, and then query, in a range covered by the cell, a scenic spot, a store, or the like that is located near the first geographical location. As described above, after finding, in the cell information stored in the memory 301, a cell that is the same as the camping cell, the coprocessor 302 in the terminal device 300 triggers to enable the GPS module 304 to detect the current first geographical location by using the GPS module 304.

In this embodiment of this application, to reduce power consumption, the terminal device 300 may periodically trigger to enable the GPS module, that is, periodically trigger to enable the GPS module 304 in the camping cell. For example, after the terminal device 300 triggers to enable the GPS module 304, the GPS module 304 is enabled for a period of time. In this period of time, the GPS module 304 detects the current first geographical location. After this period of time, the terminal device 300 may disable the GPS module 304 or control the GPS module 304 to be in a sleep state (if the terminal device 300 controls the GPS module 304 to be in the sleep state, the GPS module 304 may be woken up in a next period; or if the terminal device 300 disables the GPS module 304, the GPS module 304 may be enabled in a next period). For example, the terminal device 300 may periodically trigger, based on a motion status, to enable the GPS module 304. For example, when a current moving speed of the terminal device 300 is relatively fast, a period may be set to a relatively small value, and when a current moving speed of the terminal device 300 is relatively slow or when the terminal device 300 is static, the period may be set to a relatively large value. Certainly, the terminal device 300 may alternatively set the period in another manner. This is not limited in this embodiment of this application.

S704: The terminal device 300 determines whether a store or a scenic spot exists in a range covered by the cell and is located near the first geographical location. If the store or the scenic spot exists, S705 is performed. If the store or the scenic spot does not exist, return to S703 or S701 (return to S703 in the example of FIG. 5).

Table 1 is used as an example. It is assumed that the terminal device 300 determines that the current camping cell is the cell 1. A coordinate of the first geographical location at which the terminal device 300 is currently located is (X4, Y4, Z4). If a distance between the coordinate (X4, Y4, Z4) and the GPS information (X1, Y1, Z1) of the Starbucks is less than a preset distance, the terminal device 300 recommends the Starbucks to the user. A specific value of the preset distance herein is not limited in this embodiment of this application.

S705: The terminal device 300 outputs related information of a place such as the store or the scenic spot.

In this embodiment of this application, after determining the store or the scenic spot near the first geographical location, the terminal device 300 outputs related information (for example, a name, a location, or a feature of the store or the store) of the store or the scenic spot (for example, displays the related information on a display screen or outputs the related information in a form of voice).

When the terminal device 300 is in the screen-locked and screen-off state, if the coprocessor 302 in the terminal device 300 determines a store or a scenic spot near the first geographical location, the screen may be turned on and the information of the store or the scenic spot is displayed (for example, the screen is turned on by triggering to wake up the application processor 305). When turning on the screen, the terminal device 300 may turn on the entire screen. Alternatively, the terminal device 300 may turn on only some areas of the screen, and display the information of the store or the scenic spot in the some areas. Alternatively, after the coprocessor 302 in the terminal device 300 determines the store or the scenic spot near the first geographical location, the information of the store or the scenic spot may be displayed on the screen when the user actively triggers to turn on the screen or when the screen is turned on by triggering of other information (receiving an incoming call or a short message).

In this embodiment of this application, in the screen-locked state, the terminal device 300 may display the information of the nearby scenic spot or store on the display screen. For ease of user operation, in the screen-locked state, when the user triggers information displayed on the display screen, the terminal device 300 opens a corresponding app, and displays information related to the scenic spot or the store in the app. In this manner, the user can open, without unlocking, the information recommended by the terminal device 300 to the user. This facilitates a user operation and improves efficiency.

In an example, when displaying the information of the scenic spot or the store, the terminal device 300 may display only a name of the store or the scenic spot (in a form of text information or image information). When the terminal device 300 detects an operation that the user triggers the name, the terminal device 300 determines an app corresponding to the store or the scenic spot, opens the app, searches the app for the information related to the store or the scenic spot, and displays the information related to the store or the scenic spot in the app.

In an example, when displaying the information of the scenic spot or the store, the terminal device 300 may simultaneously display one or more shortcuts, and may open different apps or web pages by using different shortcuts. A scenic spot is used as an example. When displaying information of a scenic spot, the terminal device 300 may display two shortcuts. One shortcut is used to open a web page related to the scenic spot in a browser (for example, a web page obtained after mafengwo.com is opened by using the browser and the scenic spot is searched for). The other shortcut is used to open information related to the scenic spot in the Ctrip app. In this embodiment of this application, identity authentication may be set for some shortcuts to improve security; and the identity authentication does not need to be set for some other shortcuts. For example, when detecting that the user triggers a first shortcut, the terminal device 300 does not need to perform identity authentication. When detecting that the user triggers a second shortcut, the terminal device 300 needs to perform identity authentication, for example, need to enter an unlocking password or perform fingerprint authentication.

Figure 9:
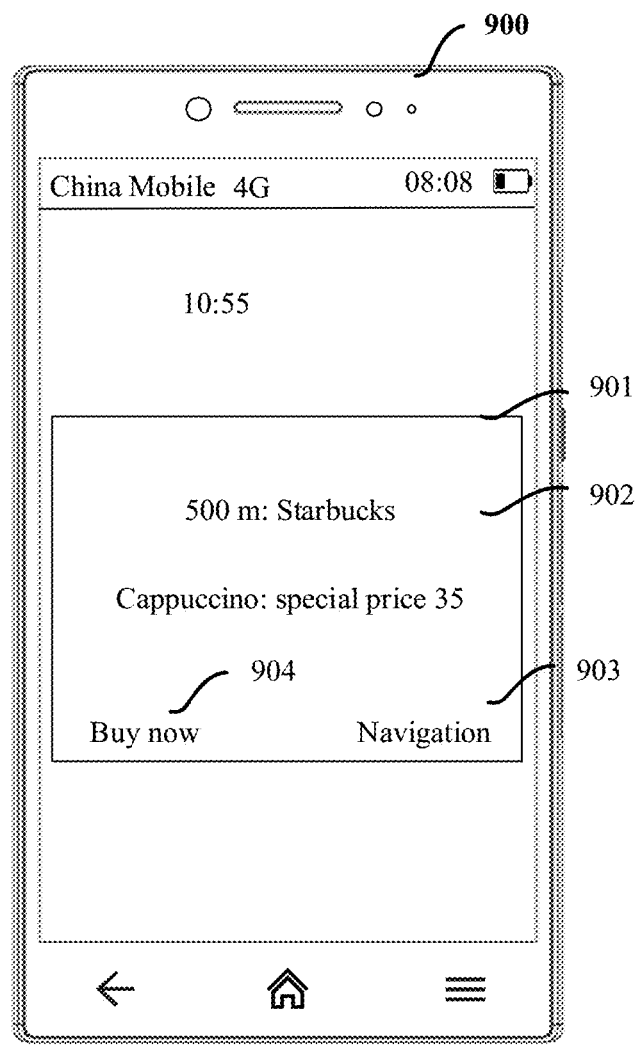
FIG. 9 is a schematic diagram of a display state of a display screen of a mobile phone according to an embodiment of the present invention.
Figure 10:
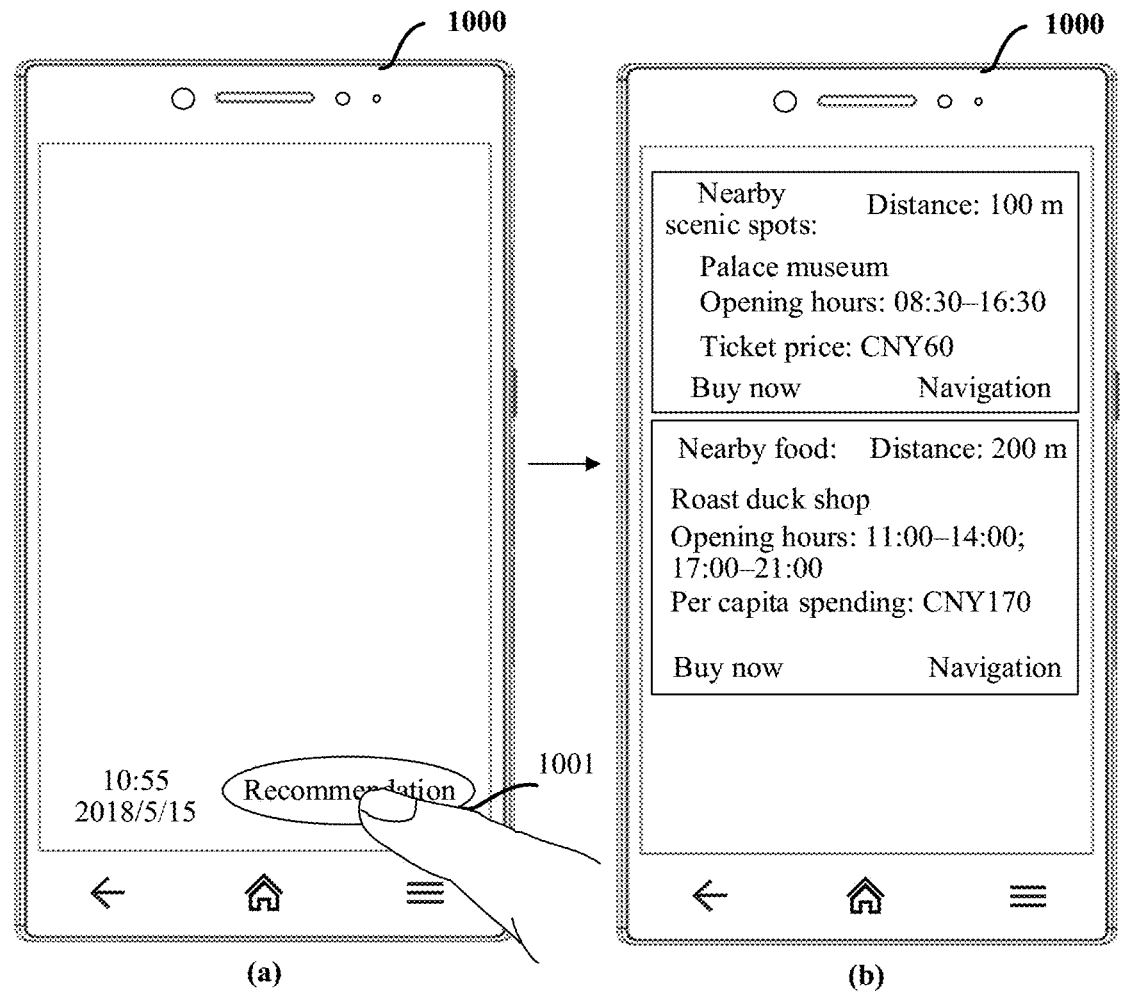
FIG. 10 is a schematic diagram of a display state of a display screen of a mobile phone according to an embodiment of the present invention.

For example, FIG. 9 and FIG. 10 are schematic diagrams of display states of a display screen according to an embodiment of this application.

In FIG. 9, in a screen-locked state, a mobile phone 900 pops up a prompt box 901, and displays prompt information 902 in the prompt box 901. The prompt information 902 is used to prompt the user that there is a Starbucks 500 m nearby. In addition, the prompt box 901 further includes two shortcut keys. When the user triggers a control "navigation" 903, the mobile phone 900 opens a map, and positions, by using the map, the Starbucks that is 500 m away from a current geographical location. If the user triggers a control "Buy now" 904, the mobile phone 900 displays a screen for fingerprint authentication or a screen for inputting unlock password. After the identity authentication is completed, the mobile phone 900 opens Meituan to purchase a cup of cappuccino.

In FIG. 9, the mobile phone directly displays information on the display screen. In actual application, the user may not want to display much information on the display screen. Therefore, the mobile phone may display only one identifier on the display screen, and when the user triggers the identifier, the mobile phone displays information recommended to the user.

For example, referring to (a) in FIG. 10, in the screen-locked and screen-on state, the mobile phone 1000 displays an icon 1001, and after the user triggers the icon 1001, displays recommended information, as shown in FIG. 10 (b).

In the embodiment shown in FIG. 5, the terminal device 300 triggers to enable the GPS module to detect the current geographical location. In fact, the terminal device 300 may further detect the current geographical location in another manner, for example, by using a Wi-Fi positioning technology.

In different scenarios, the terminal device 300 may select different manners for positioning. In a scenario, there is no Wi-Fi hotspot in an environment. For example, generally, a Wi-Fi hotspot is not enabled in a scenic spot, and the terminal device 300 cannot find the Wi-Fi hotspot in the scenic spot. For example, a user cannot find a Wi-Fi hotspot enabled in a botanical garden. Therefore, in this scenario, the terminal device 300 may detect the current geographical location of the terminal device 300 by using the GPS. In another scenario, there is a Wi-Fi hotspot in an environment. For example, currently, a Wi-Fi hotspot is usually enabled in a store. Therefore, the terminal device 300 may locate a current geographical location by using Wi-Fi. A Wi-Fi positioning process may be that the terminal device 300 searches for at least three nearby Wi-Fi hotspots, and implements positioning by using a triangulation location method. Specifically, when detecting that the terminal device 300 currently enters a cell, the coprocessor triggers to enable a Wi-Fi positioning module, to locate the current geographical location by using the Wi-Fi positioning module, and then searches for information of a scenic spot, a store, or the like near the geographical location.

Because the Wi-Fi positioning technology needs to search for at least three Wi-Fi hotspots, the terminal device 300 may detect a store density in a surrounding environment. The terminal device 300 performs positioning in a store-intensive area by using Wi-Fi, and performs positioning in a store-sparse area by using GPS.

In this embodiment of this application, in one procedure of the embodiment shown in FIG. 5, only GPS positioning or only Wi-Fi positioning may be used. Alternatively, in one procedure of the embodiment shown in FIG. 5, the GPS positioning and the Wi-Fi positioning may also be used in combination. For example, the terminal device 300 may locate the current geographical location based on the GPS, obtain information of a scenic spot, and then disable the GPS (or controls the GPS to be in a sleep state). In a period of time in which the GPS is disabled, the terminal device 300 may obtain information of a nearby store by using the Wi-Fi positioning. Because power consumption of the Wi-Fi positioning is less than that of the GPS positioning, in a manner of combining the Wi-Fi positioning and the GPS positioning, the current geographical location can be relatively accurately located, and power consumption can be reduced.

It can be learned from the foregoing descriptions that, in the information pushing method provided in this embodiment of this application, when the terminal device is in the screen-locked state, the current geographical location may be obtained, and then information of a scenic spot, a store, or the like near the geographical location is pushed to the user according to the geographical location. Without a need for the user to open a specific application program, or even without a need for the user to unlock the screen, the terminal device can obtain related information in the screen-locked state. This facilitates user operations and improves user experience.

Various implementations of this application may be randomly combined to achieve different technical effects.

In the embodiments provided in this application, the method provided in this embodiment of this application is described from a perspective in which the terminal device is used as an execution body. To implement functions in the method provided in the embodiments of this application, a terminal device may include a hardware structure and/or a software module, and implement the functions in a form of the hardware structure, the software module, or a combination of the hardware structure and the software module. Whether a function in the functions is performed by using the hardware structure, the software module, or the combination of the hardware structure and the software module depends on a specific application and a design constraint condition of the technical solution.

With descriptions of the foregoing embodiments, a person skilled in the art may clearly understand that the embodiments of this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (electrically erasable programmable read only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used by the embodiments of this application includes a compact disc (compact disc, CD), a laser disc, an optical disc, a digital video disc (digital video disc, DVD), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely embodiments of this application, and are not intended to limit the protection scope of this application. Any modification, equivalent replacement, or improvement made according to the disclosure of this application shall fall within the protection scope of this application.

What is claimed is:

1. A method for tracking a terminal device having a cellular modem and a positioning module, comprising:
   monitoring a location of the terminal device through a cellular network using the cellular modem of the terminal device, while the positioning module of the terminal device is disabled;
   determining that the terminal device enters a first cell of the cellular network based on signals from the cellular modem;
   enabling the positioning module of the terminal device in response to the determination that the terminal device enters the first cell when a display screen of the terminal device is in a screen-locked state; and
   obtaining from the positioning module a first geographical location of the terminal device in the first cell.

2. The method of claim 1, further comprising:
   determining that a place of interest exists in the first cell; and
   determining that the place of interest is within a threshold distance from the first geographical location of the terminal device in the first cell.

3. The method of claim 2, further comprising presenting information on the place of interest on the terminal device.

4. The method of claim 2, further comprising:
   storing information on the first cell and the place of interest in the terminal device; and
   determining that the place of interest is within a threshold distance from the first geographical location based on the stored information on the first cell and the place of interest.

5. The method of claim 4, wherein the information on the first cell and the place of interest includes an identification of the first cell and geographical coordinates of the place of interest.

6. The method of claim 3, wherein presenting information on the place of interest further comprises presenting the information on the place of interest on the display screen of the terminal device, while the display screen is in the screen-locked state.

7. The method of claim 1, wherein the positioning module comprises a GPS positioning module or a Wi-Fi positioning module.

8. The method of claim 1, wherein enabling the positioning module comprises:
   determining a current moving speed of the terminal device;
   periodically triggering the positioning module at a first rate, when the moving speed is greater than or equal to a first preset speed; and
   periodically triggering the positioning module at a second rate, when the moving speed is less than the first preset speed, wherein the second rate is less than the first rate.

9. The method of claim 6, further comprising:
determining a first application stored on the terminal device based on the place of interest; and
displaying a shortcut on the display screen, wherein the shortcut is configured to activate the first application to display information related to the place of interest.

10. The method of claim 1, further comprising:
determining that the terminal device leaves the first cell; and
disabling the positioning module in response to the determination that the terminal device leaves the first cell.

11. The method of claim 1, wherein the method further comprises:
triggering an application processor of the terminal device based on cell information of the first cell;
downloading cell information of a second cell from a server, wherein the second cell does not overlap the first cell; and
storing the downloaded cell information of the second cell.

12. A terminal device, comprising:
a cellular modem configured to communicate with a cellular network;
a positioning module configured to provide location information of the terminal device;
a display screen;
one or more processors; and
a memory storing data and computer-executable instructions, the computer-executable instructions, when executed by the one or more processors, causing the one or more processors to carry out:
monitoring a location of the terminal device through the cellular network using the cellular modem, while the positioning module is disabled;
determining that the terminal device enters a first cell of the cellular network based on signals from the cellular modem;
enabling the positioning module of the terminal device in response to the determination that the terminal device enters the first cell when the display screen is in a screen-locked state; and
obtaining from the positioning module a first geographical location of the terminal device in the first cell.

13. The terminal device according to claim 12, wherein the computer-executable instructions further cause the one or more processors to carry out:
determining that a place of interest exists in the first cell; and
determining that the place of interest is within a threshold distance from the first geographical location of the terminal device in the first cell.

14. The terminal device according to claim 13, wherein the computer-executable instructions further cause the one or more processors to carry out:
storing information on the first cell and the place of interest in the terminal device; and
determining that the place of interest is within a threshold distance from the first geographical location based on the stored information on the first cell and the place of interest.

15. The terminal device according to claim 13, wherein the computer-executable instructions further cause the one or more processors to carry out:
presenting information on the place of interest on the display screen, while the display screen is in the screen-locked state.

16. The terminal device according to claim 12, wherein the positioning module comprises a GPS positioning module or a Wi-Fi positioning module.

17. The terminal device according to claim 12, wherein the computer-executable instructions further cause the one or more processors to carry out:
determining that the terminal device leaves the first cell; and
disabling the positioning module in response to the determination that the terminal device leaves the first cell.

18. A computer-readable medium having computer-executable codes stored thereon, the computer-executable codes, when executed by one or more processors, causing the one or more processors to carry out:
monitoring a location of a terminal device through a cellular network using a cellular modem of the terminal device, while a positioning module of the terminal device is disabled;
determining that the terminal device enters a first cell of the cellular network based on signals from the cellular modem;
enabling the positioning module of the terminal device in response to the determination that the terminal device enters the first cell when a display screen of the terminal device is in a screen-locked state; and
obtaining from the positioning module a first geographical location of the terminal device in the first cell.

* * * * *